(12) United States Patent
Samuelsson et al.

(10) Patent No.: US 12,325,318 B2
(45) Date of Patent: Jun. 10, 2025

(54) DEVICE FOR WIRELESS POWER TRANSFER SYSTEM FOR CHARGING VEHICLE

(71) Applicant: Ningbo Geely Automobile Research & Development Co., Ltd., Ningbo (CN)

(72) Inventors: Gabriel Samuelsson, Alingsås (SE); Alexander Berggren, Gothenburg (SE); Ankur Prasad, Gothenburg (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 739 days.

(21) Appl. No.: 17/695,321

(22) Filed: Mar. 15, 2022

(65) Prior Publication Data

US 2022/0203856 A1 Jun. 30, 2022

Related U.S. Application Data

(63) Continuation of application No. PCT/CN2020/116767, filed on Sep. 22, 2020.

(30) Foreign Application Priority Data

Sep. 23, 2019 (EP) .................................. 19198899

(51) Int. Cl.
*B60L 53/38* (2019.01)
*B60L 53/12* (2019.01)
*H02J 50/10* (2016.01)
*H02J 50/40* (2016.01)
*H02J 50/90* (2016.01)

(52) U.S. Cl.
CPC ............... *B60L 53/38* (2019.02); *B60L 53/12* (2019.02); *H02J 50/10* (2016.02); *H02J 50/402* (2020.01); *H02J 50/90* (2016.02)

(58) Field of Classification Search
CPC . B60L 53/38; H02J 50/90; H02J 50/10; H02J 50/402
USPC .......................................... 320/108; 307/104
See application file for complete search history.

(56) References Cited

U.S. PATENT DOCUMENTS

| | | | |
|---|---|---|---|
| 5,379,021 A | 1/1995 | Ito et al. | |
| 8,178,995 B2* | 5/2012 | Amano | H02J 50/80 320/108 |
| 8,193,781 B2 | 6/2012 | Lin et al. | |
| 9,649,948 B2* | 5/2017 | Bell | B60L 53/34 |
| 9,793,045 B2* | 10/2017 | Abe | H01F 27/255 |
| 10,361,591 B2* | 7/2019 | Widmer | B60L 53/126 |
| 11,909,222 B2* | 2/2024 | Berggren | H02J 50/10 |
| 2013/0119779 A1* | 5/2013 | Jung | H01F 38/14 307/104 |

(Continued)

FOREIGN PATENT DOCUMENTS

| | | |
|---|---|---|
| CN | 103618350 A | 3/2014 |
| CN | 104681248 A | 6/2015 |

(Continued)

*Primary Examiner* — Richard V Muralidar
(74) *Attorney, Agent, or Firm* — Tucker Ellis LLP (57) ABSTRACT

A device for a wireless power transfer system for charging a vehicle. The device includes a coil having a first sub coil and a second sub coil both formed by one and the same continuous conductor wire. The first sub coil and the second sub coil are movably arranged relative to each other for adjustment of the charging characteristics of the device.

15 Claims, 5 Drawing Sheets

(56) References Cited

U.S. PATENT DOCUMENTS

| | | | |
|---|---|---|---|
| 2014/0225454 A1* | 8/2014 | Ichikawa | ............... H01F 38/14 307/104 |
| 2017/0182903 A1 | 6/2017 | Kwasnick | |
| 2019/0118657 A1 | 4/2019 | Wang | |

FOREIGN PATENT DOCUMENTS

| | | | |
|---|---|---|---|
| CN | 105981254 A | 9/2016 | |
| CN | 106230124 A | 12/2016 | |
| CN | 106571696 A | 4/2017 | |
| CN | 107210617 A | 9/2017 | |
| EP | 2793359 A1 | 10/2014 | |

\* cited by examiner

DEVICE FOR WIRELESS POWER TRANSFER SYSTEM FOR CHARGING VEHICLE

RELATED APPLICATION DATA

This application is a continuation of International Patent Application No. PCT/CN2020/116767, filed Sep. 22, 2020, which claims the benefit of European Patent Application No. 19198899.7, filed Sep. 23, 2019, the disclosures of which are incorporated herein by reference in their entireties.

TECHNICAL FIELD

The invention relates to a device for a wireless power transfer system for charging a vehicle, a transmitter/receiver and a wireless power transfer system for charging a vehicle.

BACKGROUND

Electric vehicles and plug in hybrid vehicles can be charged wirelessly through induction coils. Usually a first coil of a transmitter is arranged in a base pad on the floor or the ground, and a second coil of a receiver is arranged at the underside of the vehicle in a vehicle pad. Standards prescribe that one and the same base pad should be operable in several power classes in a power interval, and in several Z-classes in a ground clearance interval.

Further, there is a lot of different coil topologies used for the coils of the vehicle pads, and in some cases, it can be difficult to achieve efficient charging due to mismatch of topologies between the transmitter of the base pad and the receiver of the vehicle pad.

Thus, it is hard to optimize the base pad for transferring power efficiently for all different cases that can be relevant.

In addition, the charging requires relatively accurate alignment between the base pad and the vehicle pad.

SUMMARY

An objective of the invention is to provide a device for a wireless power transfer system for charging a vehicle, which device can be used for improved efficiency of wireless charging of vehicles.

The objective is achieved by a device for a wireless power transfer system for charging a vehicle, wherein the device comprises a coil having a first sub coil and a second sub coil both formed by one and the same continuous conductor wire, and wherein the first sub coil and the second sub coil are movably arranged relative to each other for adjustment of the charging characteristics of the device.

The invention is based on the insight that by such a device, by relative movement of the first sub coil and the second sub coil, the magnetic field of a transmitter can be adjusted to the current conditions for matching the coil type and coil position of a receiver, thereby enabling improved electromagnetic coupling between the transmitter and the receiver and efficient charging of a vehicle. The magnetic field can be optimized for several power classes and Z-classes, and the alignment tolerance interval for positioning a base pad and a vehicle pad relative to each other will be increased.

The first sub coil and the second sub coil are preferably arranged in a housing accommodating the coil. One of the first sub coil and the second sub coil can be movably arranged relative to the housing or both the first sub coil and the second sub coil can be movably arranged relative to the housing. In other words; one of the sub coils can be movable whereas the other sub coil is fixed or both sub coils can be movable.

According to one embodiment of the device, the first sub coil and the second sub coil are movable relative to each other in a direction substantially in parallel with a main extension plane of the coil. Hereby, the magnetic field of a transmitter (receiver) can be adjusted properly to match a corresponding receiver (transmitter) coil.

According to a further embodiment, a main extension plane of the first sub coil and a main extension plane of the second sub coil coincide with the main extension plane of the coil. Hereby, a relatively flat and thin base pad or vehicle pad can be achieved by using a DD-coil for instance.

According to a further embodiment, the main extension plane of the coil is intended to be substantially horizontal when the device is installed in a charging arrangement for vehicles, and preferably the first sub coil and the second sub coil are movable relative to each other in a direction intended to be substantially horizontal when the device is installed in a charging arrangement for vehicles. Hereby, by moving the sub coils relative to each other in an XY-plane, the magnetic field can be adjusted to different distances in a Z-axis direction between a base pad and a vehicle pad when charging the vehicle.

According to a further embodiment, the first sub coil and the second sub coil are movable relative to each other in a direction intended to be substantially in parallel with a driving direction of a vehicle when such a vehicle is being positioned above the device which is installed in a charging arrangement for vehicles. Hereby, corrections can be made to compensate for a somewhat incorrect positioning of the vehicle (vehicle pad) in the driving direction of the vehicle relative to a base pad, thereby allowing a more efficient electromagnetic coupling between the base pad and the vehicle pad.

According to a further embodiment, a part of the conductor wire extending between the first sub coil and the second sub coil has a slack for allowing the first sub coil and the second sub coil to be moved relative to each other in a direction away from each other. Hereby, the sub coils can be moved relative to each other without introducing any tension in the conductor wire.

According to a further embodiment, the coil is a DD-coil having two "D"-portions constituting the first sub coil and the second sub coil, respectively. Hereby, a coil having relatively high alignment tolerances and small dimensions, usable for charging vehicles, can be achieved at the same time as adjustment of the magnetic field of the coil can be performed.

According to a further embodiment, the device has a first holder, where the first sub coil is arranged in the first holder for maintaining the position of the first sub coil relative to the first holder, and a second holder, where the second sub coil is arranged in the second holder for maintaining the position of the second sub coil relative to the second holder, and where the first holder and the second holder are movable relative to each other. Hereby, the sub coils can be arranged to be moveable relative to each other in a controlled manner.

According to a further embodiment, the device comprises a housing accommodating the first holder and the second holder, where the first holder is movable relative to the housing without moving the second holder. Hereby, in addition to the fact that the housing will protect the coil, the second sub coil can be kept fixed relative to the housing which constitutes a reference point for the positions of the sub coils.

According to a further embodiment, the second holder is movable relative to the housing without moving the first holder. Hereby, correspondingly the first sub coil can be kept fixed relative to the housing which constitutes a reference point for the positions of the sub coils.

According to a further embodiment, the device has an actuator for moving the first holder relative to the housing, and, preferably the actuator comprises a belt connected to the first holder, a plurality of rollers for receiving the belt and a drive unit for driving the belt. Hereby, a rational way of moving a holder and thereby a sub coil can be achieved.

Another aspect of the invention relates to a transmitter/receiver, and a further aspect of the invention relates to a wireless power transfer system for charging a vehicle. The advantages of the transmitter/receiver and the system are substantially the same as described for the device hereinabove.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
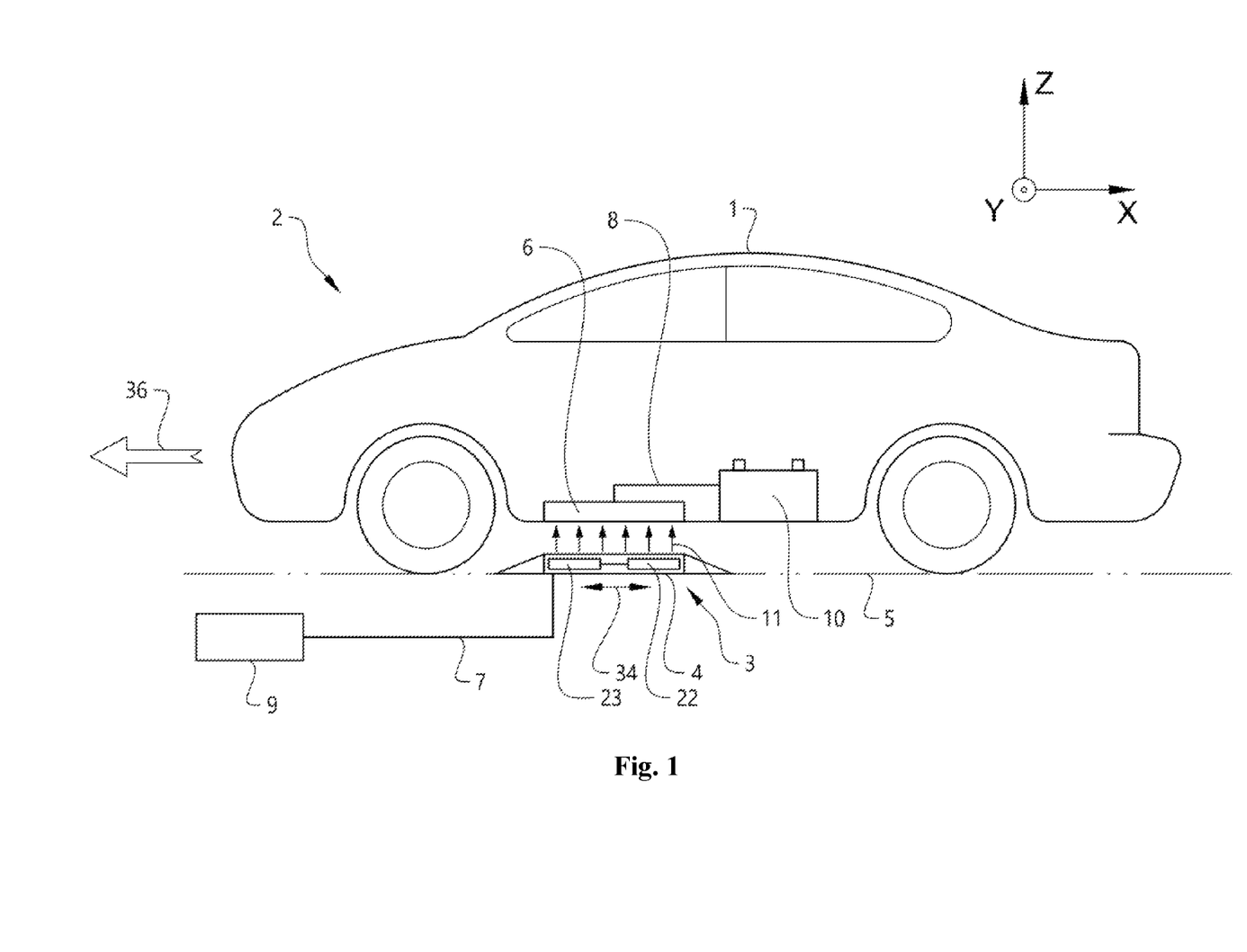
FIG. 1 is a schematic view showing a charging station and a vehicle.

FIG. 1 shows a vehicle 1 positioned at a charging arrangement 2 for vehicles, such as a charging station, where a wireless power transfer system 3 is used. The wireless power transfer system 3 includes a transmitter 4 arranged on the floor 5 and a receiver 6 arranged in the vehicle 1. Such a transmitter 4 can be arranged on or in the floor or the ground in a base pad. Further, the receiver 6 is preferably arranged on the underside of the vehicle 1 in a vehicle pad.

The transmitter 4 has a primary coil for generating an electromagnetic field and the receiver 6 has a secondary coil for interacting with the generated electromagnetic field for achieving power transfer from the primary coil to the secondary coil by electromagnetic induction. A power input 7 to the transmitter 4 can be wirelessly transferred from the transmitter 4 to the receiver 6 to achieve a power output 8 from the receiver 6. The wireless transfer of energy is schematically illustrated with arrows 11.

In the illustrated example, the transmitter 4 is powered by a power source 9 electrically connected to the transmitter 4. The power source and the power outlet thereof can be arranged at any suitable position, for example the power source can be arranged on a wall. The receiver 6 can be connected to any arrangement for storing and/or consumption of the energy transferred. In the illustrated example, the receiver 6 is electrically connected to a battery 10 arranged on the vehicle 1 for charging the battery 10. The vehicle 1 is positioned for arranging the transmitter 4 and the receiver 6 relative to each other such that energy can be transferred from the transmitter 4 to the receiver 6. The transmitter 4 and the receiver 6 are separated by a predetermined distance in the vertical direction. Further, the transmitter 4 and the receiver 6 are at least partly overlapping each other when looked at in the vertical direction.

The device according to the invention can be applied for providing a transmitter and/or a receiver of a wireless power transfer system. For example, such a wireless power transfer system device according to the invention can be used as a component of a transmitter to be arranged in base pad as illustrated in FIG. 1.

It should be stressed that when the device is used for a receiver or transmitter, the complete receiver or transmitter may include other components as well, such as electric circuits and components. Further, the invention is not in any way limited to the car application. The device can be used in any vehicle or machine application, such as for example cars, busses, trucks, industrial trucks and automated guided vehicles, construction equipment and work machines, and trains.

Figure 2:
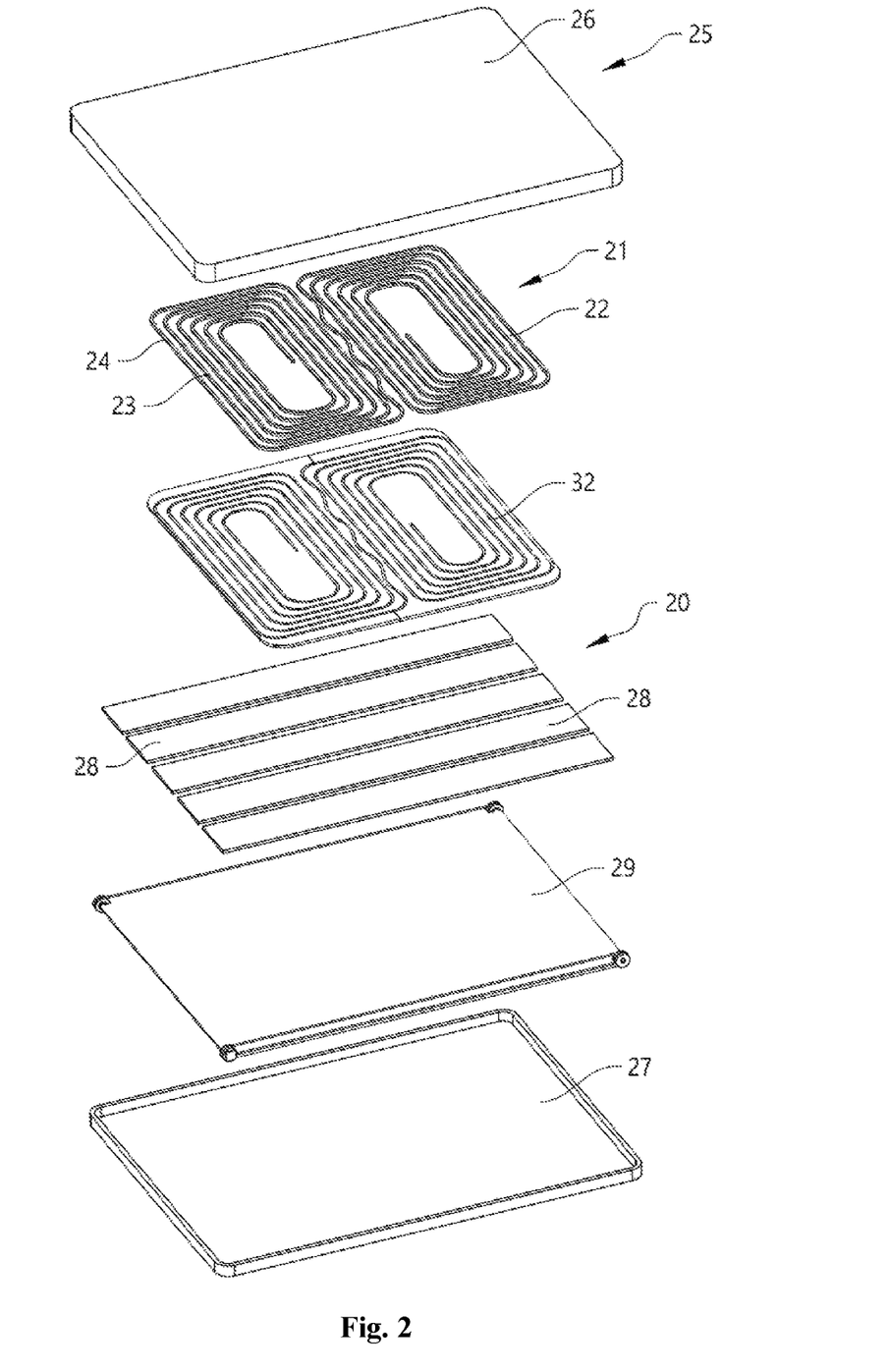
FIG. 2 is an exploded view of a device for a wireless power transfer system for charging a vehicle.

FIG. 2 is an exploded view of a device 20 for a wireless power transfer system for charging a vehicle. The device 20 can be part of the wireless power transfer system 3 illustrated in FIG. 1 as described hereinabove.

The device 20 comprises a coil 21 having a first sub coil 22 and a second sub coil 23. Both the first sub coil 22 and the second sub coil 23 are formed by one and the same continuous conductor wire 24. Although other types of conductor wire could be used, the conductor wire 24 is preferably a sum of many small strands of individually insulated copper wires, a so called Litz wire for instance. The coil can have a double-D (DD) winding pattern configuration, also called double-D (DD) coil topology, where each of the first sub coil 22 and the second sub coil 23 constitutes a "D"-portion of the DD-coil. Alternatively, each of the first sub coil and the second sub coil can have a circular square (CS) winding pattern configuration, also called circular square (CS) coil topology.

Such DD and CS coil topologies are suitably used in transmitters and receivers for charging vehicles, though other topologies also are possible.

The coil 21 is arranged in a housing 25. The housing has a top cover 26 and a bottom cover 27 shown separated from each other in FIG. 2. The top cover 26 and the bottom cover 27 are to be connected to each other for accommodating the coil 21 inside the housing 25. The top cover 26 and the bottom cover 27 are mechanically connectable to each other for forming the housing. In addition to the coil 21, one or more ferrite plates 28 are arranged inside the housing 25 between the coil 21 and the bottom cover 27. Between the bottom cover 27 and the ferrite plates 28, a back plate 29 is arranged. The back plate 29 is an insulation plate made by aluminium for instance. These components to be arranged inside the housing 25 are illustrated between the top cover 26 and the bottom cover 27.

The number of ferrite plates 28 can be varied, and such a ferrite plate may in turn be divided into a plurality of sub ferrite plates and/or be designed in different shapes. The function and design of such a ferrite plate is well known by the person skilled in the art and will not be further described herein.

Figure 3A:
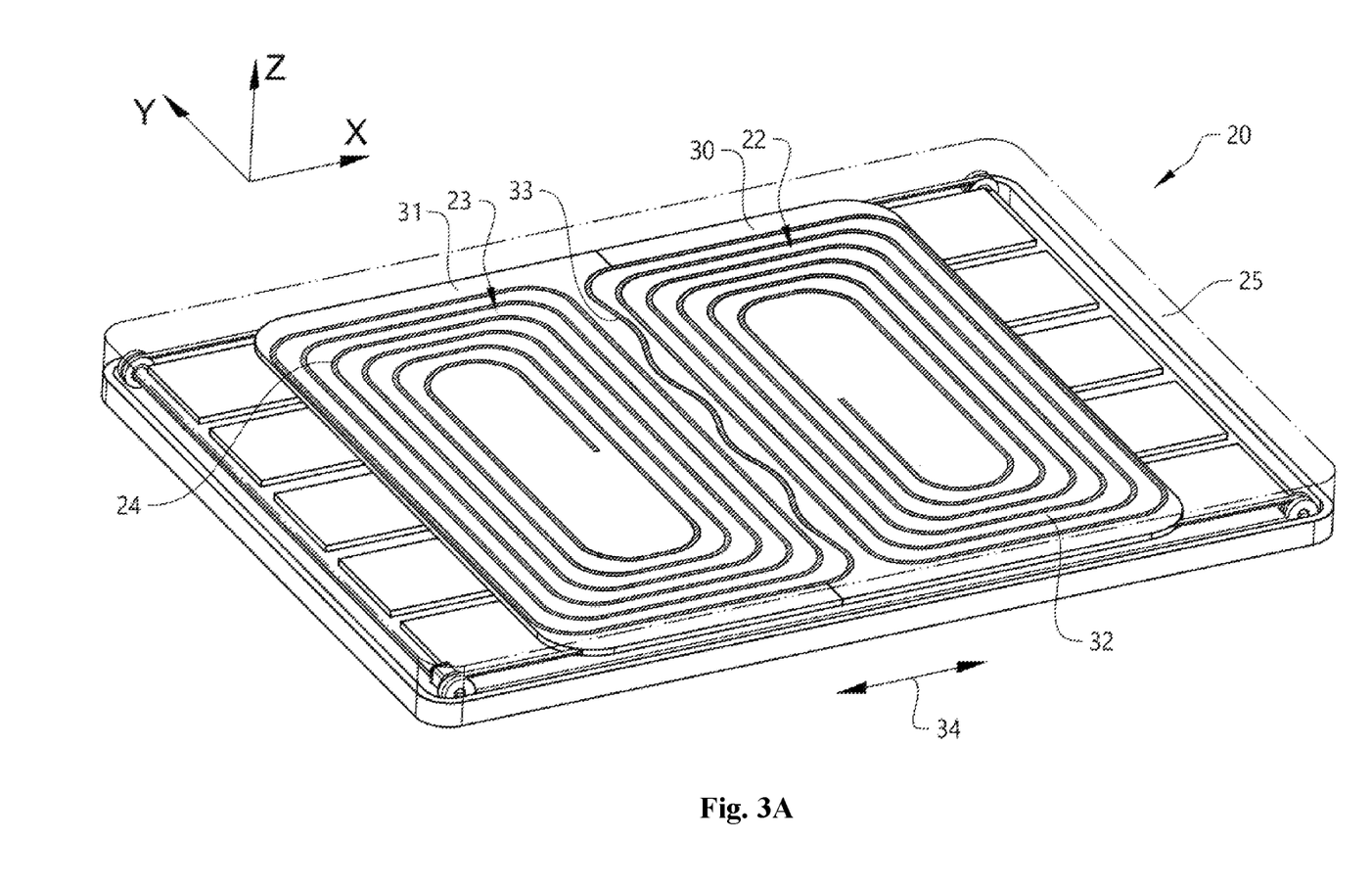
FIG. 3A is a perspective view of the device in FIG. 2, showing a first sub coil arranged in a first holder and a second sub coil arranged in a second holder.
Figure 3B:
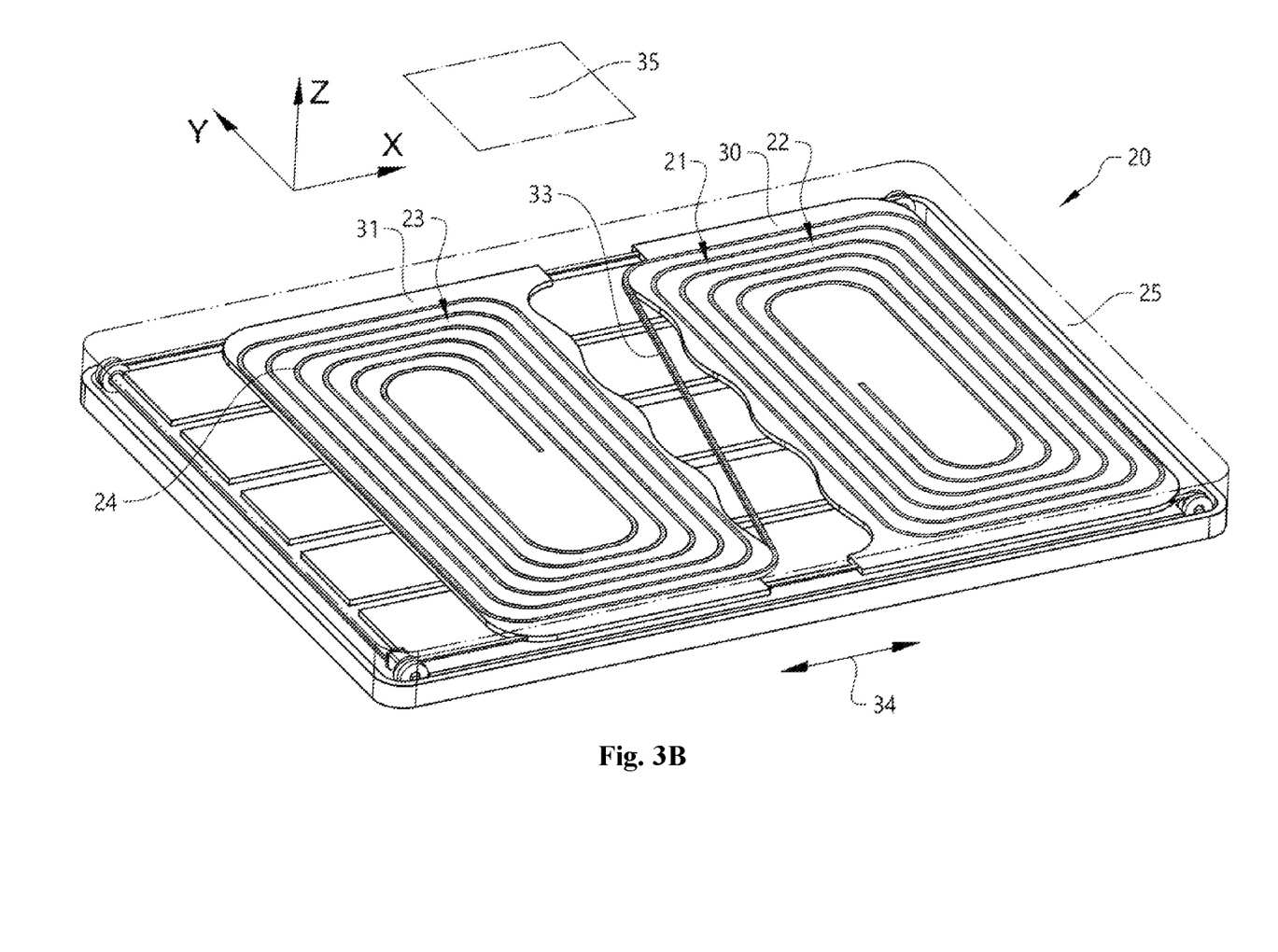
FIG. 3B is a perspective view of the device in FIG. 2, where the first holder and the second holder have been moved relative to each other as compared to FIG. 3A.

FIGS. 3A and 3B are perspective views of the device 20 in FIG. 2, where the housing 25 and the other components are assembled. For illustration purposes only, the housing 25 is depicted as transparent to show the components arranged inside the housing.

As illustrated in FIG. 3A, the device 20 suitably comprises a first holder 30, where the first sub coil 22 is arranged in the first holder 30 for maintaining the position of the first sub coil 22 relative to the first holder, and a second holder 31, where the second sub coil 23 is arranged in the second holder 31 for maintaining the position of the second sub coil 23 relative to the second holder. Each holder 30, 31 is suitably plate-shaped with a relatively small thickness, and has a main extension plane extending in parallel with the main extension plane of the housing 25. Each holder 30, 31 can have grooves, recesses or protruding walls 32 for receiving and holding the sub coil 22, 23 in a predetermined winding pattern. See also FIG. 2.

The first sub coil 22 and the second sub coil 23 are movably arranged relative to each other for adjustment of the charging characteristics of the device 20. This can be achieved by making the first sub coil 22 and/or the second sub coil 23 movable relative to the housing 25.

In the example embodiment illustrated in FIGS. 3A and 3B, the first holder 30 and the second holder 31 are movable relative to each other, and thereby the sub coils 22, 23 are movable relative to each other. The first holder 30 can be movable relative to the housing 25 without moving the second holder 31, and vice versa. Although, the first holder 30 and the second holder 31 both are independently moveable relative to the housing 25 in the example embodiment illustrated, in another embodiment one holder can be movable and the other holder can be fixed relative to the housing.

A part 33 of the conductor wire 24 extending between the first sub coil 22 and the second sub coil 23 can have a slack for allowing the first sub coil 22 and the second sub coil 23 to be moved relative to each other in a direction away from each other. In FIG. 3A, this conductor wire part 33 has maximal slack since the first holder 30 and the second holder 31 are brought as close as possible to each other. The conductor wire part 33 forms one or more S-formations. This enables the holders to be moved away from each other as illustrated in FIG. 3B, where the slack of the conductor wire part 33 is used for compensating for the increased distance between the first holder 30 and the second holder 31.

A Cartesian coordinate system having axes X, Y and Z is indicated in FIGS. 3A and 3B. The first sub coil 22 and the second sub coil 23 are movable relative to each other in a direction 34 substantially in parallel with a main extension plane 35 of the coil 21. The main extension plane 35 of the coil 21 is parallel with the XY-plane. In addition to this main extension, the coil 21 has a relatively small thickness in a direction in parallel with the Z-axis. A main extension plane of the first sub coil 22 and a main extension plane of the second sub coil 23 preferably coincide with the main extension plane 35 of the coil 21.

The movement direction 34 of the first sub coil 22 and the second sub coil 23 is indicated with an arrow which is parallel to the X-axis. The Cartesian coordinate system with the axes X, Y and Z, and the movement direction 34 are also indicated in FIG. 1. In operation, when installed, the first sub coil 22 and the second sub coil 23 are preferably movable relative to each other in the direction 34 intended and configured to be substantially horizontal when the device 20 is installed in the charging station 2. Thus, in this case the device 20 is arranged such that the Z-axis is parallel with a vertical direction and the XY-plane is horizontal. In other words; the main extension plane 35 of the coil 21 is intended and configured to be substantially horizontal when the device 20 is installed in the charging station 2 as illustrated in FIG. 1.

Vehicles to be charged at the charging station 2, is suitably guided in a predetermined direction for alignment with the base pad comprising the transmitter 4. Thus, the vehicle will have a predetermined driving direction 36 when approaching the charging position. The first sub coil 22 and the second sub coil 23 are suitably movable relative to each other in the direction 34 intended and configured to be substantially in parallel with the driving direction 36 of the vehicle 1 when such a vehicle 1 is being positioned above the device 20 which is installed in the charging station 2.

Figure 4:
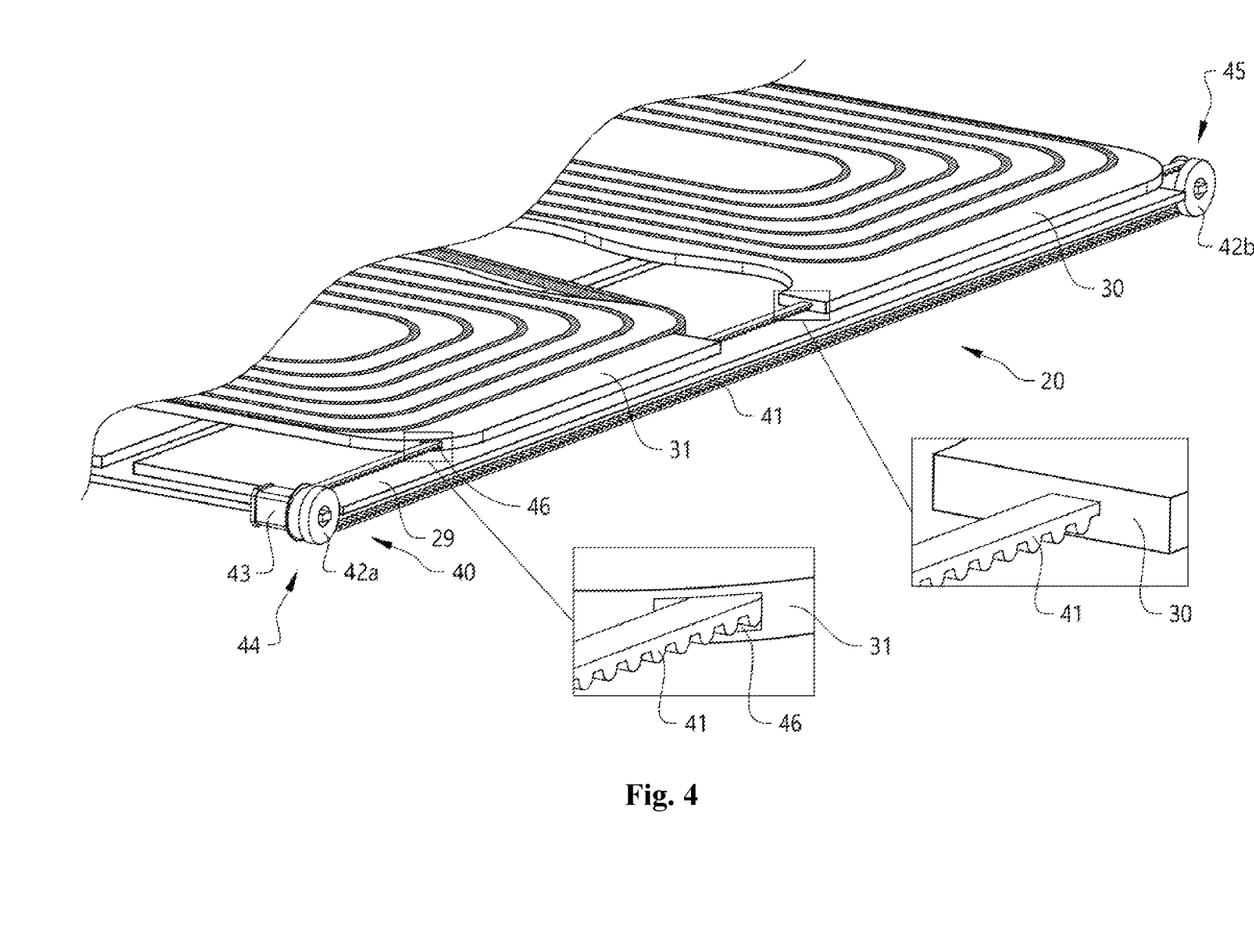
FIG. 4 is a perspective view showing an actuator for moving a holder relative to a housing of the device illustrated in FIG. 2.

FIG. 4 shows an enlarged portion of the device 20 in a perspective view. The device 20 comprises an actuator 40 for moving the first holder 30 relative to the second holder 31.

The first holder 30 is movable relative to the housing 25 without moving the second holder 31. The actuator 40 has a belt 41 connected to the first holder 30, a plurality of rollers 42a, 42b for receiving the belt 41, and a drive unit 43 for driving the belt. The first holder 30 and the belt 41 can be permanently connected to each other or be connected when the first holder 30 is to be moved.

The rollers 42a, 42b can be belt rollers or pulleys for instance. In the example embodiment illustrated in FIG. 4, a first roller 42a is arranged in a first end 44 of the device 20 at the back plate 29. The first roller 42a can be arranged on a shaft of the drive unit 43 which in turn is arranged on the back plate 29. The back plate 29 is suitably fixed relative to the housing 25 such that the first holder 30 can be moved relative to the housing 25. A second roller 42b can be arranged on a shaft arranged on the back plate 29 in a second opposed end 45 of the device 20. The belt 41 is driven by the drive unit 43 and runs over the rollers 42a, 42b and through the second holder 31. The second holder 31 has through hole 46 which allows the belt 41 to pass without carrying the second holder 31.

The drive unit 43 can be an electric motor, such as an electric stepping motor for driving the belt 41.

As indicated in FIGS. 2, 3A and 3B, the device 20 can have an additional actuator for moving the second holder 31 relative to the first holder 30. The second holder 31 is then movable relative to the housing 25 without moving the first holder 30. Such an actuator can be similar to the actuator already described for the first holder and be arranged on an opposite side of the back plate relative to the actuator for the first holder. The function and the components can be the same with the exception that the belt is connected to the second holder 31, and the first holder 30 has a through hole which allows the belt to pass without carrying the first holder.

It is to be understood that the present invention is not limited to the embodiments described above and illustrated in the drawings; rather, the skilled person will recognize that many changes and modifications may be made within the scope of the appended claims.

What is claimed is:

1. A device for a wireless power transfer system for charging a vehicle, the device comprising a coil having a first sub coil and a second sub coil both formed by one and the same continuous conductor wire, wherein the first sub coil and the second sub coil are movably arranged relative to each other for adjustment of the charging characteristics of the device.

2. The device according to claim 1, wherein the first sub coil and the second sub coil are movable relative to each other in a direction substantially in parallel with a main extension plane of the coil.

3. The device according to claim 2, wherein a main extension plane of the first sub coil and a main extension plane of the second sub coil coincide with the main extension plane of the coil.

4. The device according to claim 2, wherein the main extension plane of the coil is intended to be substantially horizontal when the device is installed in a charging arrangement for vehicles.

5. The device according to claim 1, wherein the first sub coil and the second sub coil are movable relative to each other in a direction intended to be substantially horizontal when the device is installed in a charging arrangement for vehicles.

6. The device according to claim 1, wherein the first sub coil and the second sub coil are movable relative to each other in a direction intended to be substantially in parallel with a driving direction of a vehicle when such a vehicle is being positioned above the device being installed in a charging arrangement for vehicles.

7. The device according to claim 1, wherein a part of the conductor wire extending between the first sub coil and the second sub coil has a slack for allowing the first sub coil and the second sub coil to be moved relative to each other in a direction away from each other.

8. The device according to claim 1, wherein the coil is a DD-coil having two "D"-portions constituting the first sub coil and the second sub coil.

9. The device according to claim 1, wherein the device has a first holder, the first sub coil being arranged in the first holder for maintaining the position of the first sub coil relative to the first holder, and a second holder, the second sub coil being arranged in the second holder for maintaining the position of the second sub coil relative to the second holder, the first holder and the second holder being movable relative to each other.

10. The device according to claim 9, wherein the device comprises a housing accommodating the first holder and the second holder, the first holder being movable relative to the housing without moving the second holder.

11. The device according to claim 10, wherein the second holder is movable relative to the housing without moving the first holder.

12. The device according to claim 10, wherein the device comprises an actuator for moving the first holder relative to the housing.

13. The device according to claim 12, wherein the actuator has a belt connected to the first holder, a plurality of rollers for receiving the belt and a drive unit for driving the belt.

14. A transmitter or receiver for a wireless power transfer system for charging a vehicle, wherein the transmitter/receiver comprises a device according to claim 1.

15. A wireless power transfer system for charging a vehicle, the system comprising a base pad for interacting with a vehicle pad arranged on the vehicle, the base pad comprising a device according to claim 1.

* * * * *